(No Model.)  6 Sheets—Sheet 1.

G. H. OGDEN.
BOOK BINDING APPARATUS.

No. 391,266.  Patented Oct. 16, 1888.

WITNESSES,
N. S. Amstutz
Geo. M. King

George H. Ogden INVENTOR.
By Liggett & Liggett Attorneys.

(No Model.) 6 Sheets—Sheet 2.

G. H. OGDEN.
BOOK BINDING APPARATUS.

No. 391,266. Patented Oct. 16, 1888.

WITNESSES
George H. Ogden, INVENTOR.
By Leggett & Leggett, Attorneys.

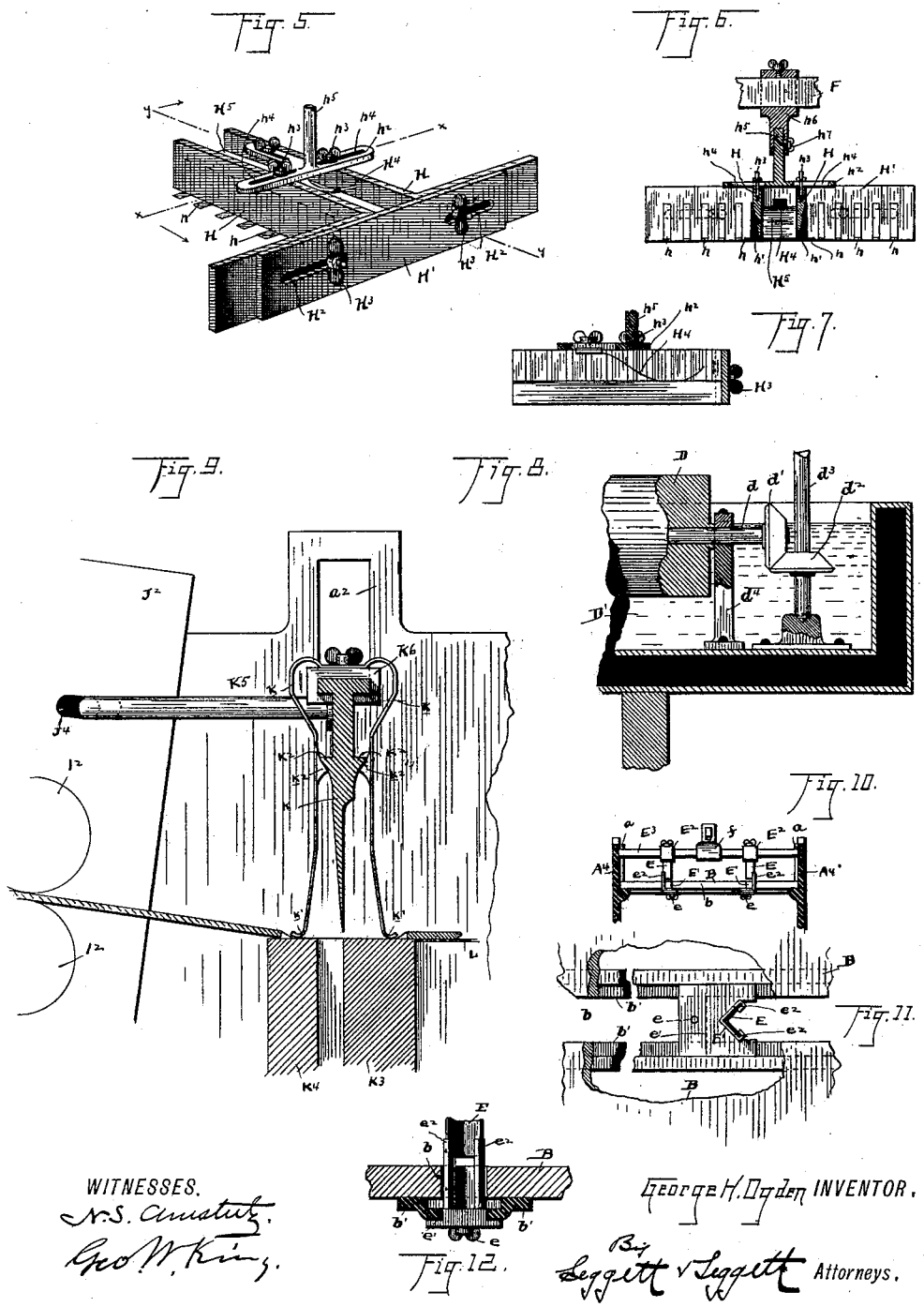

(No Model.) 6 Sheets—Sheet 4.
G. H. OGDEN.
BOOK BINDING APPARATUS.
No. 391,266. Patented Oct. 16, 1888.
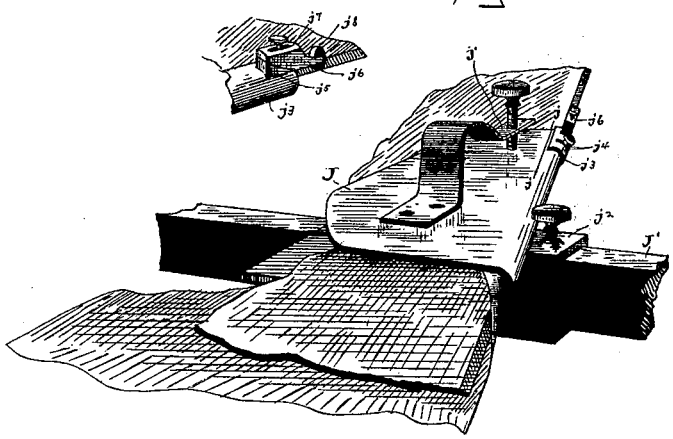
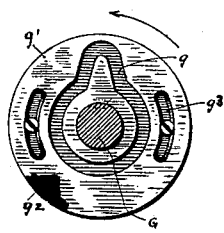
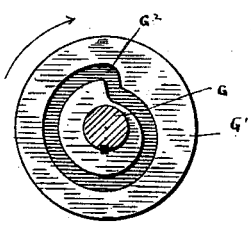
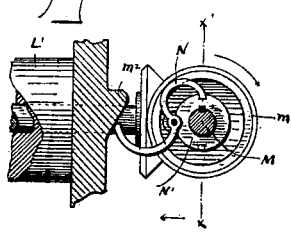
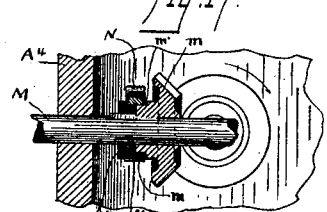
WITNESSES
George H. Ogden, INVENTOR.
By Leggett & Leggett Attorneys.

(No Model.) 6 Sheets—Sheet 5.
G. H. OGDEN.
BOOK BINDING APPARATUS.
No. 391,266. Patented Oct. 16, 1888.
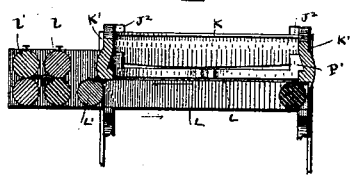
Fig. 18.
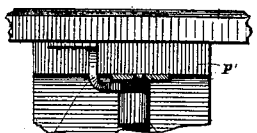
Fig. 25.
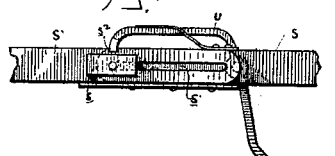
Fig. 21.
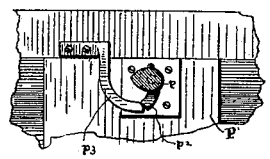
Fig. 19.
Fig. 22.
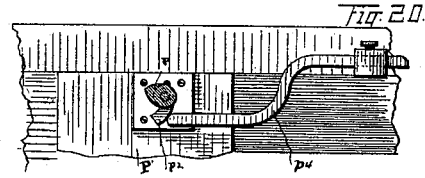
Fig. 20.
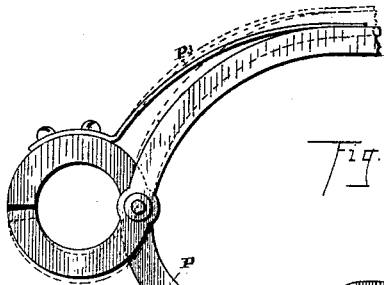
Fig. 23.
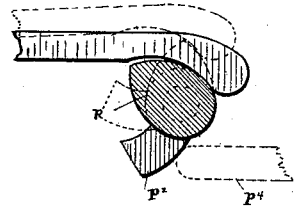
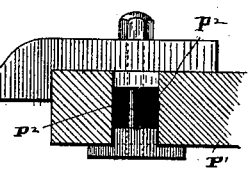
Fig. 24.
WITNESSES.
C. S. Amstutz
Geo. W. King
George H. Ogden INVENTOR.
By Leggett & Leggett Attorneys.

(No Model.)

6 Sheets—Sheet 6.

G. H. OGDEN.
BOOK BINDING APPARATUS.

No. 391,266. Patented Oct. 16, 1888.

WITNESSES.

Geo. H. Ogden, INVENTOR.
By Leggett & Leggett,
Attorneys.

UNITED STATES PATENT OFFICE.

GEORGE H. OGDEN, OF CLEVELAND, OHIO.

BOOK-BINDING APPARATUS.

SPECIFICATION forming part of Letters Patent No. 391,266, dated October 16, 1888.

Application filed April 20, 1886. Serial No. 199,529. (No model.)

*To all whom it may concern:*

Be it known that I, GEORGE H. OGDEN, of Cleveland, in the county of Cuyahoga and State of Ohio, have invented certain new and useful Improvements in Book-Binding Apparatus; and I do hereby declare the following to be a full, clear, and exact description of the invention, such as will enable others skilled in the art to which it pertains to make and use the same.

My invention relates to book-binding apparatus for making so-called "cases" for book-covers in which the material, usually cloth, is slit into suitable widths and wound onto a roller, from whence it is passed, one strip at a time, over a glued roller, and from thence is drawn upon a table with the glued side up. Notches are cut in the edges of cloth where the latter is afterward severed, and the necessary strip of paper and blanks of binder's board are applied to the blanks. The latter are next passed through folders, when the edges of the cloth on two sides are folded over the two edges of the binder's board. Next the strip of cloth is severed on a line through the aforesaid notches, and the severed blank is carried, by means of an endless belt, laterally and forward of the rollers and folders, that fold the remaining sides of the cloth over the edges of the card-board, in which finished state the cases are discharged at the sides of the machine, the work in the main being done automatically by the machine.

Figure 1:
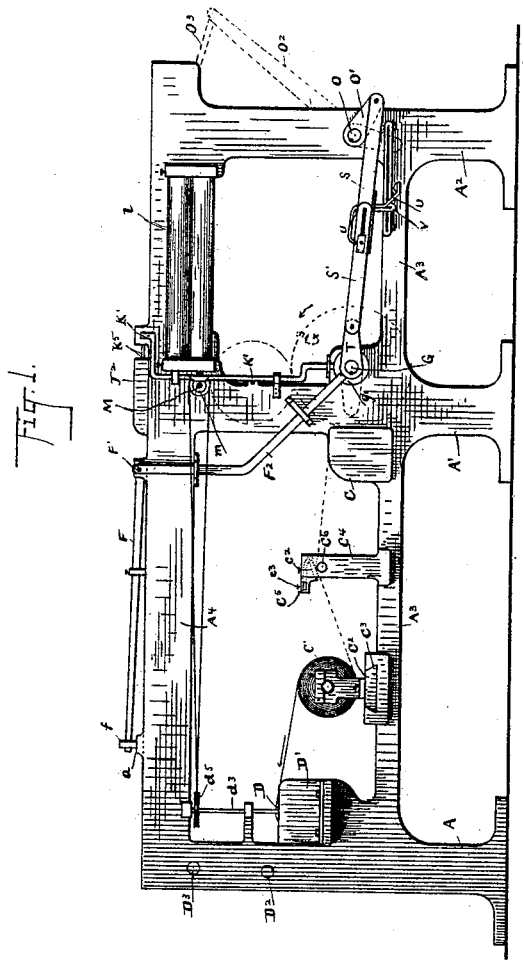
Figure 2:
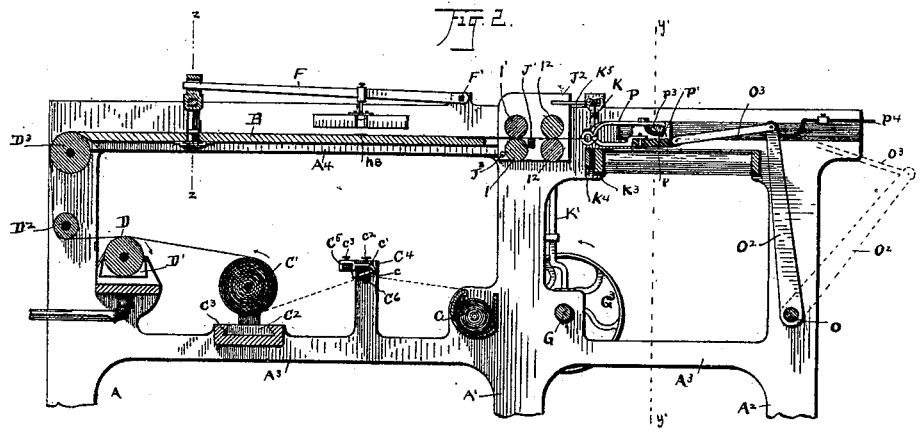
Figure 3:
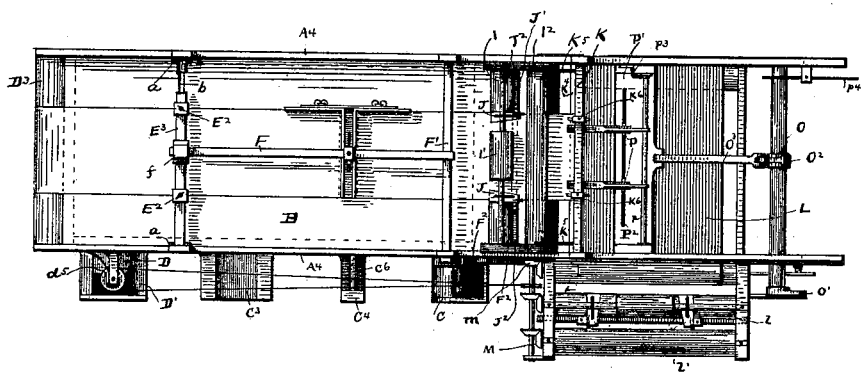
Figure 4:
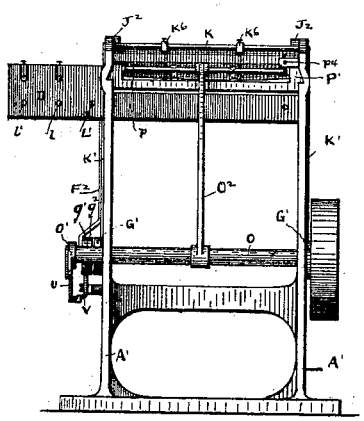
Figure 26:
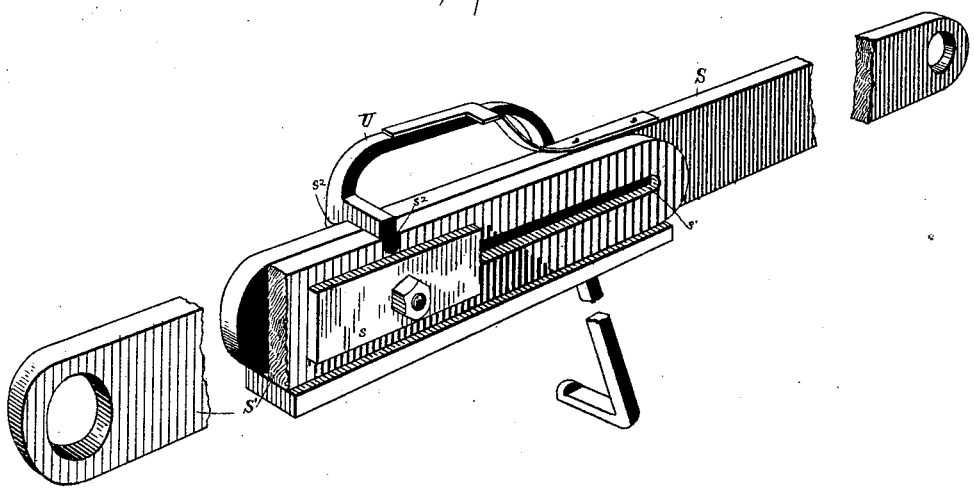
Figure 27:
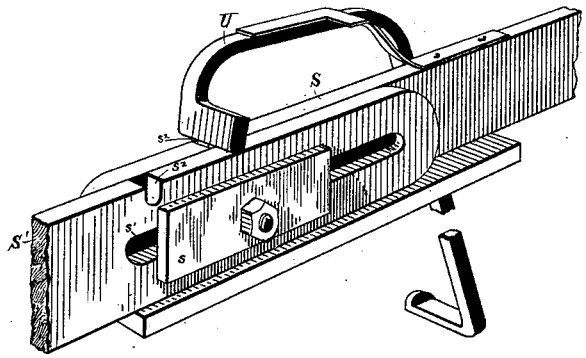

In the accompanying drawings, Figure 1 is a side elevation of a machine embodying my invention. Fig. 2 is an elevation in longitudinal section through the center of the machine. Fig. 3 is a plan view. Fig. 4 is a right-hand end elevation. Fig. 5 is a view in perspective of the gage. Fig. 6 is a vertical section on the line $x\ x$, Fig. 5, looking in the direction of the arrow. Fig. 7 is a vertical section on the line $y\ y$, Fig. 5. Fig. 8 is an elevation in longitudinal section through the center of the glue-box, showing the portion of the box where the gears are located. Fig. 9 is an enlarged transverse section of the knife K and roller-frame, showing the knife in position near the end of its downstroke. Fig. 10 is an elevation in section on the line $z\ z$, Fig. 2. Fig. 11 is a plan view of the bottom portion of one of the pinkers, the top portion showing in section. Fig. 12 is an elevation, partly in section, showing the rear or outside of one of the pinkers and the adjacent portion of the table and supporting-bars for the pinker. Fig. 13 is a view in perspective of the folders. Fig. 14 is an elevation showing the face side of the cam-disk $g'$. Fig. 15 is an elevation showing the face side of the cam-disk $g^2$. Fig. 16 is an elevation, partly in detail, of the mechanism for giving intermittent motion to the endless apron. Fig. 17 is an elevation in section on the line of $x'\ x'$, Fig. 16. Fig. 18 is an elevation in transverse section on the line of $y'\ y'$, Fig. 2, looking toward the left hand. Figs. 19 and 20 are elevations, partly in section, showing the cam-shaft for operating the pinchers, and respectively the forward and rearward stops for operating the cam-shaft. Fig. 21 is a side elevation of a portion of the connecting-rods S' and attachment. Fig. 22 is a plan view of the same. Fig. 23 is a side elevation of one of the pinchers P. Fig. 24 is a diagram illustrating the movement of the cranks T and rock-arm O'. Fig. 25 is a plan view of the mechanism shown in Fig. 19. Figs. 26 and 27 are enlarged details in perspective of the connecting-rods S S', the former showing the slip-joint of the rod collapsed and locked by the dog, and the latter showing the slip-joint partly distended, portions being broken away to reduce the drawing to the size of the sheet.

A suitable frame-work is had, consisting, in the main, of the legs A, A', and A², arranged in pairs, girders A³ and A⁴, and suitable cross-bar, the frame-work supporting the table B and other portions of the mechanism belonging to the machine. The material, usually cloth, (and we will speak of it as "cloth" in this specification,) comes in rolls of considerable width, and has to be slit into suitable strips, according to the size of the covers to be made. The rolls of cloth are first placed in a suitable trough or holder, C, and from thence are wound onto the roller C', the latter having a removable crank (not shown) for the purpose. Between the trough C and the roller C' are located the slitting-knives, arranged as follows: Standards C⁴ have attached at the top and one side a cross bar, C⁵, and lower down a second cross-bar, C⁶, the latter being of metal and round in cross-section, the two cross-bars running parallel and located substantially as shown in Figs. 1 and 2. A series of slitting-knives, c, are pivoted, respectively, between the forked end of the arms c', the knives extending obliquely over the top of the rod $C^6$, and are held in contact with the rod by thumb-screws $c^2$, that pass through threaded holes in the respective arms. These arms c' embrace loosely the cross-bar $C^5$, so that they may be moved along endwise of the bar, and are held in the desired position on the bar by thumb-screws $c^3$. By loosening the two sets of thumb-screws the arms are adjusted on the cross-bar to bring the knives in position to slit the material into strips of the required widths. Enough of these knives are had to slit the widest material into the narrowest strips required. The material in passing from the trough C to the roller C' passes over the rod $C^6$, and consequently engages and is slit by the knives. Before the knives are pressed down on the rod $C^6$ by the thumb-screws the material is passed by hand to the roller C' and secured thereto. This of course leaves the material for a short distance uncut; but it is easily torn apart by hand before it passes through the machine, or by the machine itself. The rear end of each piece of material may be tacked to the forward end of the next piece, and so on until a large quantity of material is wound on the roller C'.

The base of the frame $C^2$, that supports the roller C', fits in a way, $C^3$, the two forming a dovetail. (See Figs. 1 and 2.) The frame $C^2$ therefore may be slid along endwise in the way $C^3$ to bring successively the different rolls or strips in line with the machine. The end of the first roll or strip of material is forced by hand into the machine, and the rear end thereof is tacked to the forward end of the next strip or roll, the machine being stopped a moment to adjust the frame $C^2$ to bring the next strip in line with the machine. The roller D, over which the material next passes, is of considerable size and extends down into a trough, D', that is kept supplied with glue. The roll D is geared to move in an opposite direction to the passing material, by means of which the under surface of the cloth is evenly coated with glue.

The glue-trough itself may be of any suitable construction, of which many varieties are well known, and will have a steam-chamber or other mechanism for applying heat or not, according to the kind of glue used. The shaft d of the glue-roller has a pinion, d', that engages the pinion $d^2$ of the upright shaft $d^3$, the latter gear being below, as shown more clearly in Fig. 8, by which arrangement the gears operating in the glue are not clogged, as would be the case if the gear $d^2$ were above the surface of the glue, in which latter case the glue would dry onto the gear; also, by removing the caps of the boxes $d^4$, in which the shaft d is journaled, the glue-roll may be removed from the trough whenever it is necessary without disturbing the shaft $d^3$. The upper end of the shaft $d^3$ has a pulley, $d^5$, that is connected by a belt with the shaft M. The cloth next passes under the roll $D^2$, and from thence over the roll $D^3$, by which arrangement the dry side of the cloth engages these rolls, the latter roll being elevated sufficiently to direct the cloth on top of the table B.

The material is drawn into the machine with an intermittent movement, and while at rest is notched on the edges, where the cloth is afterward severed to form the different cases. These pinkers or notching devices are located near the front edge of the table B, and are as follows: V-shaped knives E, that have a vertical movement, co-operate with correspondingly-shaped dies, E', the two having preferably a shearing cut.

The dies E' are located in a transverse slot, b, of the table B, and slide on ways b', that are secured to the under side of the table on either side of the slot b. By means of thumb-screws e and binders e' the respective dies are rigidly secured in the desired positions, separated more or less according to the width of the cloth that is to be notched. Lugs $e^2$ extend upward from the head of each die some little distance above the face of the table, and these lugs on their inner faces have grooves in which the back edges of the respective knives fit easily, the grooves forming ways for the knives. (See Figs. 11 and 12.) The knives are secured to blocks $E^2$, that respectively embrace the cross-head $E^3$. The blocks are secured on the cross-head by set-screws, and when the latter and the thumb-screws e are loosened the blocks, knives, and dies may be moved along crosswise of the table B.

The cross-head $E^3$, at the ends thereof, operates in vertical ways a of the frame. The cross-head, at the center thereof, is connected by a link, f, with the lever F, the latter passing through a vertical slot in the link, the slot being of sufficient length to so nearly accommodate the vertical movement of the lever that the cross-head and knives are only moved the short distance necessary in notching the cloth.

The lever F is mounted on the rock-shaft F', to which latter is attached a rock-arm, $F^2$. The lower end of the arm $F^2$ has a laterally-projecting stud (not shown) that operates in the cam-groove g of the disk g', the latter being mounted loose on the driving-shaft G, the latter being provided with a suitable driving-pulley, $G^3$. (See Fig. 1.) Next behind the disk g' is the disk $g^2$, the latter being rigidly secured to the shaft. The disk g' has elongated holes $g^3$, through which the securing-bolts pass, by means of which this latter disk may be turned on the shaft to time the notching-knives with other parts of the machine.

When cases are made by hand, the cloth is cut into rectangular pieces and the four corners of the blank are cut off, so that the edges of the blank may be properly folded and have well-finished corners. The triangular notches cut by the knives E serve the same purpose, the blanks being severed on lines through the apices of these notches. Before the blanks are severed and while the cloth is at rest on the table B each successive blank is re-enforced by pieces of binder's board and a piece of paper, each having been previously prepared. The binder's "board" or "boards," as they are usually named, are of suitable size for the sides of the book-covers, and the paper strip extends along the center of the blanks, where the latter are afterward applied to the back of the book. It is therefore necessary that these re-enforcing materials should be accurately applied to the blanks. For this purpose is provided a gage that is as follows: Angle-irons H are set edgewise to the table and are adjustably secured to the plate H', the latter having slots $H^2$, through which the bolts pass that secure the angle-irons. These bolts are provided with thumb-nuts $H^3$, by loosening which the angle-irons may be moved toward or from each other, so as to accommodate the aforesaid strips of paper that are placed flatwise and in quantities between them. Small points, so small that they would not be visible if made on the drawings, extend laterally and toward each other from the lower inner edges of the angle-irons and support the paper strips $H^5$, and a slight spring, $H^4$, presses the strips of paper down onto these points. Outside and on both legs of the angle-irons are secured light springs $h$. These are bent at right angles, as shown more clearly in Fig. 5, so that the lower ends of the springs stand out a trifle from the face of the angle-irons. Behind the springs $h$ the angle-irons are cut away at $h'$, (see Fig. 6,) so that, if the toes of the springs are pressed upon, the springs may be bent back into the recess $h'$. A cross-bar, $h^2$, extends across the angle irons and is secured thereto by bolts and thumb-nuts $h^3$, the bolts being secured to the angle-irons and passing through slots $h^4$ of the cross-bar. These thumb-nuts are of course loosened when the angle-irons are adjusted on the plate H'. A vertical spindle, $h^5$, extends up from the cross-bar and enters a socket in the yoke $h^6$, and is secured therein by a thumb-screw, $h^7$. This thumb-screw has a conical point, and the spindle has two conical holes, at right angles to each other, for receiving the points of the set-screws, by means of which the gage may be set in the position shown in Fig. 3 or at right angles to such position, according as the long way of the case is made lengthwise or crosswise of the cloth, the cloth having been slit to the best advantage to cause as little waste as possible. The yoke $h^6$ embraces the lever F, and is secured thereon by a set-screw, by loosening which the yoke is slid along the lever to bring the gage in the desired position. A thin cleat or strip of wood, $h^8$, card-board, or almost anything at hand, and of suitable width to enter between the angle-irons, is glued, tacked, or otherwise temporarily secured to the table, so as to be directly under the strips of paper held between the angle-irons. The edges of this cleat should be rounded, so that the cloth will readily draw over the same. As the gage by the movement of the lever F is depressed upon the table the cloth is forced up by the cleat against the bottom strip of paper, and the latter, adhering to the glued surface of the cloth, is drawn out when the gage is again elevated. While the gage is in its elevated position, the operator places the aforesaid pieces of binder's board onto the toes of the springs $h$, holding the pieces snugly into the corners of the angle-irons. When the gage rests upon the table, the operator presses the boards firmly upon the cloth and holds them thus while the gage moves upward, the toes of the springs drawing out from under the board, as aforesaid.

The lever F in its depressed position is intended to be parallel with the table, so that the gage operates the same regardless of its distance from the rock-shaft F', except that the gage is elevated more or less according to its position on the lever—a matter, however, of no consequence. The blanks next pass between the rolls I and I', and thence through the folders J, thence through the rolls $I^2$, after which the cloth is severed by the knife K. The rolls I and $I^2$ extend about the width of the machine, while the face of the roll I' is only three or four inches long and supposed to be less than the width of the narrowest cases that are to be made on the machine. The first set of these rolls only holds the case from being pressed together by the folders in case the aforesaid strip of paper at the center of the case should run lengthwise of the cloth. Between these two sets of rollers is a metal bar, J', for holding the folders. This latter is rigidly joined to side pieces, $J^2$, in which side pieces the trunnions of the two sets of rolls are journaled, the parts J' and $J^2$ forming a rigid frame that at points $J^3$ is pivoted to the supporting-frame, so that the rear of the frame may be tilted.

The folders are of thin metal bent in the form shown in Fig. 13, resembling a hemmer of a sewing-machine. The plate is slit on the line $j\, j$, and the upper lip may be depressed by the spring and thumb-screw $j'$, so as to press slightly on the top of cases. The folder is secured to a sleeve, $j^2$, that slides on the bar J'. The folders are made right and left handed and set facing each other, and are adjusted on the bar J' to fit the cases and fold the edges of the cloth over the edges of the boards. A plate, $j^3$, having a concaved face to fit the rounded edge of the folders, is secured by a set-screw that passes through a slot, $j^4$, extending widthwise of the plate. The rear end of the plate has an incline, $j^5$, and a block, $j^6$, having a corresponding incline, is secured by a set-screw that extends through a slot, $j^7$, lengthwise of the block $j^6$. On the rear end of the block $j^6$ is mounted a tiny roller, $j^8$. This roller is made to travel on the edge of the case to press the cloth against the edge of the board, and in case the latter has a beveled edge the plate $j^3$ may be turned on the edge of the folder to make the face of the roller $j^8$ fit such beveled edge. By adjusting the block $j^6$ on the incline $j^5$ the roller is made to give the desired pressure on the edge of the case.

The enlarged ends of the knife K operate in vertical slots $a^2$ of the supporting-frame. To the ends of the knife are attached the rods K'. The latter, passing through suitable guides, have at their lower ends laterally-projecting studs that operate respectively in the cam-grooves $G^2$ of the disks G', the latter being mounted on the driving-shaft G. The shape of the cam-groove (see Fig. 15) is such that during the greater part of a revolution the knife is held elevated.

Blocks $K^6$ are fitted to the head of the knife, so as to slide endwise on the latter, and are secured in the position in which they are adjusted by thumb screws. (See Fig. 9.) Each block carries a set of springs, $k$, secured thereto, the latter being made very thin and light, and the ends of the springs are turned outward, forming feet $k'$. The knife has inclines $K^2$ on either side that engage corresponding inclines, $k^2$, on the respective legs of the springs. Parallel metal bars $K^3$ and $K^4$ are connected with the supporting-frame, the former serving as the severing-bar against which the knife operates. When the knife is near the end of its downstroke and just before it severs the cloth, the feet $k'$ press down the folded edges of the cloth close to the edges of the cardboard, after which the further downward movement of the knife by means of the inclines aforesaid spreads the legs of the springs, causing the feet thereof to push the fold or upper part of the cloth in the sharp angle at the bottom of the card-board, the spring meantime bending at the curved upper portion thereof to accommodate the slight downward movement of the knife that occurs after the feet press the cloth upon the bars $K^3$ and $K^4$. Just when the feet have performed their functions the cloth is severed, and the knife is quickly elevated.

As soon as a blank is severed it is carried by the apron L and passed out between rolls $l\,l$ and $l'\,l'$ and through folders located between these rollers, that fold the other two edges of the cloth, in a manner already described. Fingers $K^5$ are connected with the knife and engage the parts $J^2$, the ends of the fingers being bent at right angles and the lateral parts operating, respectively, in slots $J^4$, by which arrangement the frame is tilted by the movement of the knife, and the cases are depressed onto the bars $K^3$ and $K^4$ just before the cloth is severed by the knife. When the knife is elevated, the tilting frame is brought to a horizontal position, and the end of the next blank is elevated and held suspended midway between the bar $K^3$ and the edge of the knife and in position to be grasped by the pinchers P. The roll L', that drives the apron and the rolls $l\,l$ and $l'\,l'$, is geared from the shaft M, that in turn is geared from the driving-shaft.

The shafts G and M may be intergeared in any suitable manner, so that the two shafts turn the same number of revolutions, and in the present instance they are made to turn in opposite directions, although this latter is a matter of no importance, as the bevel-gears and mechanism on the shaft M might be arranged to allow the shaft to turn in the same direction as the driving-shaft, if so preferred. A cross or open belt may lead to the glue-roller, according to the direction that the shaft M is made to turn. It may be remarked that the driving-pulley could be mounted on the shaft M in case it would be found more convenient to do so.

The apron moves intermittently, and to accomplish the same I have the following: The gear $m$, that drives the apron-roll, is mounted loosely on the shaft M, and is driven by a spring-dog, N, that is pivoted to the disk N', the latter being rigidly secured to the shaft M. The head of the dog engages notches $m'$, of which there are two, located on the periphery and on opposite sides of the hub of the gear $m$. The rear end of the dog, once during a revolution of the shaft M, engages an incline, $m^2$, of the frame-work and trips the dog out of one of the notches $m'$, whereupon the apron-roll stops and the head of the dog slides on the periphery of the hub until the next notch $m'$ is reached, when the dog again drives the apron-roll during another half-revolution of the shaft M.

The pinchers P are adjustably secured to a cross-head, P', the ends of the latter reciprocating in suitable ways of the frame. The cross-head is reciprocated by means of a rock-shaft, O, rock-arms O' and $O^2$, the latter being connected by the rod or link $O^3$ with the cross-head, and the arm O' being connected by a device, S, (hereinafter described,) with the crank T. The throw of the cross-head is sufficient to draw the largest-sized case onto the apron, after which the blank is carried by the latter through the succeeding rollers.

By means of the slots $P^2$, through which the bolts pass that secure the respective pinchers to the cross-head, the pinchers may be set the required distance apart, so as to grasp the blank near the edges thereof. The pinchers are closed, respectively, by springs $P^3$, and are opened by a cam-shaft, $p$, the trunnions of which are journaled in the cross head. When the toe $p'$ of the cam is elevated, as shown in dotted lines, Fig. 23, the jaws of the pinchers are held open. The cam-shaft at one end has a depending lug, $p^2$, that just as the cross-head reaches the end of its forward movement engages a stop, $p^3$, by means of which engagement the cam is turned down, so that the pinchers grip the edge of the blank, the latter, as aforesaid, being held elevated for this purpose. With the rearward movement of the cross-head the blank is drawn upon the apron, and when the line where the blank is to be severed comes under the knife K the lug $p^2$ engages an adjustable stop, $p^4$, that turns up the cam, and by opening the pinchers releases the blank and leaves it in the required position. The crosshead, after the engagement of the lug $p^2$ with the stop $p^4$, continues to the end of its rear stroke, the toe of the cam meanwhile remaining elevated and the pinchers remaining open until the next engagement of the lug $p^2$ with the stationary stop $p^3$.

The machine thus far described could be operative if the blanks were all of one length, or of such length that the distance from a line drawn through the apices of the notching-knives or pinkers E to the knife K would be a multiple of the length of the blank. For instance, if the distance from the knives E to the knife K was forty-eight inches, it is evident that with blanks respectively four, six, eight, twelve, sixteen, and twenty-four inches long the notching-lines and severing-lines could be made to correspond, so that the knife K would sever the blanks where they had been notched. But suppose the length of blanks to be ten inches. Four such blanks would extend from the pinkers along the table B forty inches, (eight inches short of the knife K,) and five blanks, extending fifty inches, would reach two inches beyond the knife K. The distance from the knives E to the knife K for such blank should therefore be a multiple of ten—say thirty, forty, or fifty inches. Doubtless a machine could be built that could be telescoped so as to bring the set of knives in their proper relative positions for making the different-sized casings; but such a machine would be expensive to build and difficult to adjust. In view of these difficulties I have devised a peculiar connecting-rod and co-operating mechanism for connecting the rock-arm O' with the crank T and operating the former. The connecting-rod is in two parts, S and S', the former having a laterally-projecting block, $s$, attached that slides in the slot $s'$ of the part S', thus forming a slip-joint in the connecting-rod. By means of the lost motion thus had in the connecting-rod the throw of the crank T (that without such lost motion would be too great) causes the cross-head P' to move its full distance, as aforesaid. Now, with the crank T moving forward or rearward, in either case, with each half-throw of the crank, the lost motion of the connecting-rod is taken up before the rock arm O' and crosshead T' are moved at all. Notches $s^2$ are made across the edges of the two parts S and S', and the notches register when the connecting-rod is in position with the slip-joint collapsed. A spring-dog, U, is pivoted to the part S of the rod and engages the notches $s^2$ when these are in line. This dog, while engaging the notches, locks the two parts of the rod so that they move together without distending the rod at the slip-joint. The lever end of the dog is bent laterally and made to engage and trip over an adjustable stop, V, to release the dog at the desired point. If the member S of the connecting-rod, and to which the dog is pivoted, were cut away, so as to leave no notch $s^2$ on this member, the same result would be had; but in such case the strain would come on the pivot of the dog, and this part would likely soon be worn, so that lost motion would be had at this point. The dog, having been tripped out of the notches $S^2$, slides along on top of the member S' until by the collapsing of the slip-joint on the return-stroke the notches $s^2$ respectively on the two members S and S' are again brought in line, when the dog drops into the notches and locks the parts. The two members S and S' being arranged side by side, and the dog being made to extend across and engage the notches $s^2$ of both members of the connecting-rod, a firm and durable lock is had, not likely to break or get out of order. The crank T moves in the direction of the arrow, and the lateral projection of the lever end of the dog on the return-stroke of the crank moves under the stop V; but as the crank raises the connecting-rod for the forward stroke the dog is raised in position to engage the stop V, when it is advanced far enough for such an engagement.

Now, by means of the dog U, and with the stop properly adjusted at the commencement of the forward stroke of the crank T, the crosshead P' is moved rearward far enough to draw the cloth a suitable distance to be notched by the pinkers. The dog U then engaging the stop V, the dog is tripped out, and the cross-head P' consequently remains at rest while the lost motion is being drawn out of the connecting-rod, and during this time of rest the pinkers operate. After the lost motion is taken up the cross head continues its rearward movement, and the pinchers P, by means of the stop $p^4$, are opened in time to stop the cloth in position to be severed by the knife K, and just as the severing is done the apron is set in motion.

It will be remembered that the length of the blank is regulated entirely by the stop $p^4$. The dog U only divides the movement of the blank and allows the cloth midway of this movement to remain at rest while the pinkers are doing their work. In the supposed case, the length of table being forty-eight inches, the length of cases being ten inches, the cloth, after being severed, should be moved two inches before the pinkers operate, and then move the remaining eight inches before the knife K operates. The cam-disk $g'$ is of course adjusted for each different-sized blank to time the pinkers with the throw-off of the dog U.

Where the distance between the pinkers and severing-knife is a multiple of the lengths of blanks being cut, the dog U is not required, and may be removed or adjusted so as to be inoperative.

In diagram Fig. 24 is shown the direction that the crank T moves, and numerals 1, 2, 3, and 4 are marked on the track of the forward sweep of the crank from dead-center to dead-center, inclusive. We will suppose that during the time that the crank moves from point 2 to point 3 the aforesaid slip-joint of the connecting-rod is being drawn out. During such time the rock-arm O' remains stationary at the point marked ⅔ on the sweep of the arm. On the back-stroke the slip-joint is always first collapsed before the arm O' is moved forward. To recapitulate: The throw of the crank T, less the lost motion of the connecting-rod, is just enough, by means of the connecting mechanism described, to reciprocate the cross head P' the full throw of the latter. The lost motion of the connecting-rod is therefore, and of necessity, always a factor in these movements, this lost motion in one way or another being always utilized and the cross-head being always moved its full throw. Without the dog U the said lost motion would be taken up in the first instance as the crank left its respective dead-centers, and the cross-head consequently would not move in either direction until such lost motion was first taken up. The lost motion of the connecting-rod, therefore, has nothing to do with the distance that the web is drawn along through the machine at the rearward movement of the cross-head, this latter being controlled entirely by opening the pinchers P at the proper time. The stop $p^4$ for opening these pinchers having been set so as to cause the web to be drawn the required distance into the machine, the lost motion of the connecting-rod causes the cross-head to remain at rest for a short time while the pinkers are doing their work. If, as in the one supposed case, the web is to be cut into lengths that are a multiple of the table B, the dog U is removed or fastened back so as to be inoperative, and the lost motion is therefore had at the ends of the stroke of the cross-head. If, on the other hand, the web is to be cut into lengths that are not a multiple of the table B, the dog U, by means of a suitable adjustment of the stop V, is tripped at such times during the rearward movement of the cross-head as shall have caused the web to have been drawn along to where the pinkers should notch the web. In the supposed case of a table forty-eight inches long and of the web being cut into lengths of ten inches, when the web has been moved ten inches and is in position to be severed, it is evident that the rear end of the fourth blank will have been drawn eight inches past the pinkers. In such case the dog U is tripped when the cross-head has moved rearward two inches, and after the pinkers have done their work, and meantime the lost motion of the connecting-rod has been taken up, the cross-head resumes its rearward movement and the web is drawn eight inches farther, at which latter point the pinchers release the web, leaving it in position to be severed ten inches from the rear end of the web. For instance, suppose the throw of the cross-head was eighteen inches. The stop $p^4$ might be set so as to cause the web to be drawn only four or five inches, or even less, with each rearward movement of the cross-head, and this stop having been adjusted at any given point, the web will be cut into uniform length so long as the stop remains at such point.

What I claim is—

1. A machine for making so-called "cases" for book-covers, the same having notching and severing knives, gage and folders, pinchers adapted to intermittingly engage the material for feeding it to the knife, and suitable connecting and co-operating mechanism, arranged substantially as described.

2. In book-binding apparatus, the combination, with a roller for slitted material set in ways for adjusting the roller endwise, of a glue-trough and glue rolls, arranged substantially as described.

3. In book-binding apparatus, the combination, with a roller for applying glue or paste to the strip, a knife for severing the strip into sheets, and notching-knives and co-operating dies set in reverse order, of ways and cross-head, arranged substantially as indicated, whereby the knives may be adjusted laterally according to the width of the material, substantially as set forth.

4. In book-binding apparatus, the combination, with a roller for applying glue or paste to the strip, a knife for severing the strip into sheets, notching-knives located between the knife and glue-roller, and connected cross-head, arranged substantially as indicated, of a lever, a device having a cam-groove, and connecting mechanism for intermittently operating the notching-knives, substantially as set forth.

5. In book-binding apparatus, the combination, with notching-knives and lever for operating the same intermittently, of a gage secured to the said lever and made adjustable lengthwise on the lever, substantially as set forth.

6. In book-binding apparatus, the combination, with a gage made adjustable in size, substantially as indicated, of a spindle and yoke for connecting the gage with the actuating-lever and revolving the gage on its axis, substantially as set forth.

7. In book-binding apparatus, a gage consisting, essentially, of angle-plates having slots $h'$, and connecting tie-plate, the latter having slots and securing-bolts for adjusting the same, springs $h$, and recesses $h'$, the parts being arranged substantially as described.

8. In book-binding apparatus, the combination, with angle-plates set edgewise and adjustably connected and held by a vertical spindle and socket, and provided with a series of recesses, of a spring located between the angle-plates, adapted to press downward, and a series of springs connected with the legs of the angle-plates and located in front of the recesses, the feet of the springs turning outward, substantially as set forth.

9. In book-binding apparatus, the combination, with a vertically-reciprocating severing-knife, of rollers mounted in a tilting frame, suitable connecting mechanism between the tilting frame and knife, whereby the frame and knife are moved simultaneously, substantially as set forth.

10. In book-binding apparatus, the combination, with folders set in pairs and made adjustable widthwise of the material, of rollers mounted on the respective folders and means, substantially as indicated, for adjusting the rollers vertically and for inclining the axes of the rollers, substantially as set forth.

11. In book-binding apparatus, the combination, with rollers set in a tilting frame, a knife, and mechanism connecting the knife and frame, whereby the movement of the former tilts the latter, of pinchers mounted on a reciprocating cross-head and means, substantially as indicated, for automatically opening and closing the pinchers, the parts being timed to operate substantially as set forth.

12. In book-binding apparatus, the combination, with reciprocating cross-head, and pinchers mounted thereon, of a cam-shaft mounted on the cross-head, a stop or abutment engaging a projection on said cam-shaft for automatically opening the pinchers, and springs for closing the same, substantially as set forth.

13. In book-binding apparatus, the combination, with a reciprocating cross-head, pinchers mounted thereon and made adjustable lengthwise of the cross-head, and springs connected with the pinchers for closing the same, of a cam-shaft journaled in the cross-head for simultaneously opening the pinchers, substantially as set forth.

14. In book-binding apparatus, the combination, with pinchers, cross-head, and springs, arranged substantially as indicated, of a cam-shaft mounted on the cross-head, a depending arm or lugs connected with the cam, and stops for engaging such depending arm and actuating the cam-shaft, substantially as set forth.

15. In book-binding apparatus, the combination, with a reciprocating cross-head and suitable means for moving the same intermittently, pinchers mounted on the cross-head, a cam-shaft for opening the pinchers, and devices for automatically operating the cam-shaft, the parts being arranged substantially as indicated, of an endless apron made to move intermittently and at right angles to the movement of the cross-head, the parts being timed to operate substantially as set forth.

16. In book-binding apparatus, the combination, with a reciprocating cross-head, pinchers mounted thereon, and a cam-shaft for actuating the pinchers, of a stop for engaging the arm of the cam-shaft and closing the pinchers at one end of the throw of the cross-head, an adjustable stop for actuating the cam and opening the pinchers midway of the rearward movement of the cross-head, substantially as set forth.

17. In book-binding apparatus, the combination, with a reciprocating severing-knife, of springs connected with the knife, the latter having feet for engaging the fabric, inclines arranged, respectively, on the knife, and springs for separating the latter after the engagement of the feet of the springs with the fabric, substantially as set forth.

18. In a book-binding apparatus, the combination, with rolls, an endless apron mounted on said rolls, and a pinion secured to one of said rolls, of a shaft, a loose pinion mounted thereon and meshing with the pinion secured to the roller, a dog secured to the shaft and adapted to engage the loose pinion, and a stationary cam for disengaging the dog and pinion, substantially as set forth.

19. In book-binding apparatus, the combination, with an apron and suitable gears for driving the same, the driving member of the gear being mounted loosely on the driving-shaft, the loose gear having notches on the periphery thereof, of a spring-dog connected with the shaft for engaging such notches and rotating the gear, and an incline for tripping the dog, the parts being arranged substantially as indicated.

20. In book-binding apparatus, the combination, with a reciprocating cross-head, pinchers, and mechanism for actuating the pinchers, substantially as indicated, of a rock-shaft and connecting-links for actuating the cross-head, a crank and connecting-rod for actuating the rock-shaft, said connecting-rod having a slip-joint, a spring-dog, and stops for controlling the movement of the slip-joint, substantially as set forth.

21. In book-binding apparatus, the combination, with a reciprocating cross-head, pinchers mounted thereon, and mechanism for operating the pinchers, substantially as indicated, of a crank, rock-shaft and arms, link and connecting rod, the latter having a slip-joint for moving the cross-head intermittently, notches in the members of the connecting-rod, a spring-dog for engaging the notches, and adjustable stops for tripping the dog, the parts being arranged substantially as described.

In testimony whereof I sign this specification, in the presence of two witnesses, this 4th day of March, 1886.

GEORGE H. OGDEN.

Witnesses:
CHAS. H. DORER,
ALBERT E. LYNCH.